United States Patent [19]

Prosenbauder

[11] Patent Number: 4,953,456
[45] Date of Patent: Sep. 4, 1990

[54] TOOL HOLDER FOR A PICKLING MACHINE AND TOOL COMBINATION FOR USE IN SUCH A HOLDER

[76] Inventor: Otto Prosenbauder, Innstrasse 23, A-1201 Wien, Austria

[21] Appl. No.: 359,654
[22] PCT Filed: Nov. 13, 1987
[86] PCT No.: PCT/AT87/00066
 § 371 Date: May 19, 1989
 § 102(e) Date: May 19, 1989
[87] PCT Pub. No.: WO88/03758
 PCT Pub. Date: Jun. 2, 1988
[51] Int. Cl.⁵ .................. A23B 4/02; A22C 9/00
[52] U.S. Cl. ......................... 99/533; 17/25; 17/51; 99/535
[58] Field of Search .......... 99/419, 421 R, 532, 99/533, 535, 516, 494, 345; 426/281; 17/25, 51; 27/24.1

[56] References Cited

U.S. PATENT DOCUMENTS

| | | |
|---|---|---|
| 2,854,342 | 9/1958 | Komarik . |
| 3,441,980 | 5/1969 | Defenbaugh .................. 99/532 |
| 3,576,158 | 4/1971 | Greenspan et al. .................. 99/254 |
| 3,581,651 | 6/1971 | Johnson . |
| 3,661,072 | 5/1972 | Allinquant et al. .................. 99/532 |
| 3,779,151 | 12/1973 | Ross .................. 99/533 |
| 4,182,002 | 1/1980 | Holec . |
| 4,286,510 | 9/1981 | Prosenbauer .................. 99/535 |
| 4,680,832 | 7/1987 | Langen .................. 17/25 |
| 4,690,046 | 9/1987 | Corominas .................. 99/535 |
| 4,864,922 | 9/1989 | Higashimoto .................. 99/533 |

FOREIGN PATENT DOCUMENTS

| | | |
|---|---|---|
| 1395301 | 5/1964 | France . |
| 2032012 | 11/1970 | France . |
| 8102121 | 11/1982 | Netherlands .................. 99/533 |

*Primary Examiner*—Timothy F. Simone
*Attorney, Agent, or Firm*—Townsend and Townsend

[57] ABSTRACT

On a pickling machine different kinds of tools can be connected to a common take-up means (1) at choice. Each kind of tools has a connection head (5) which can be connected to the take-up means (1) and carries the tools (needles (13) and/or knives (14)). All connection heads (5) are formed equal to each other and have openings (25) for the needles (13), through which openings the brine streams. Thereby the pickling machine can be used also as a tenderizer (FIG. 4).

12 Claims, 3 Drawing Sheets

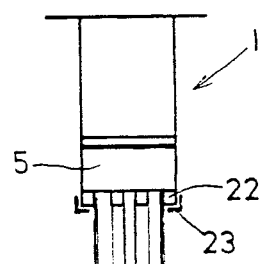
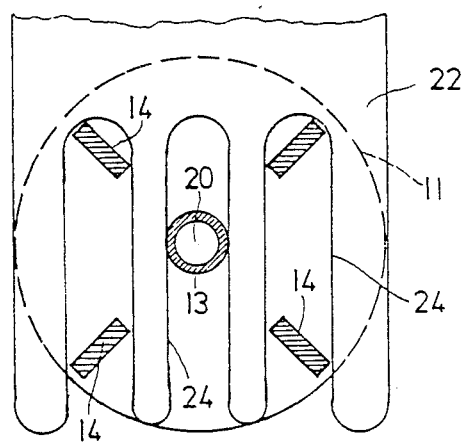
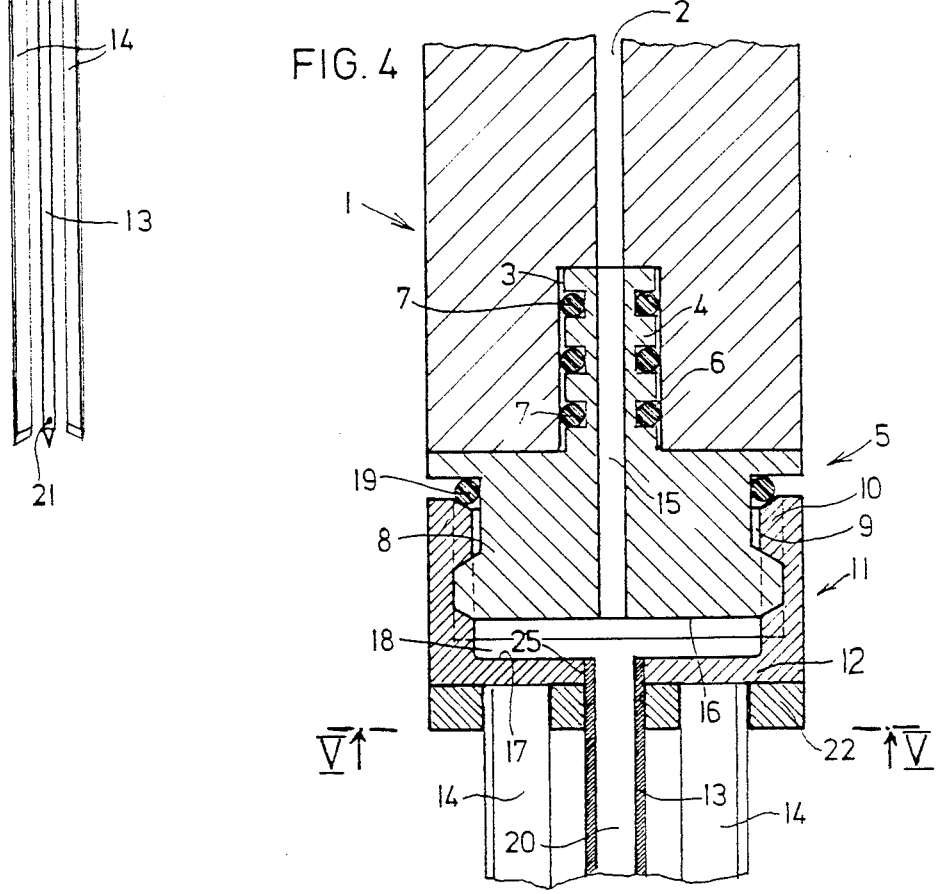

TOOL HOLDER FOR A PICKLING MACHINE AND TOOL COMBINATION FOR USE IN SUCH A HOLDER

BACKGROUND OF THE INVENTION

The invention refers to a tool holder for a pickling machine in which on a pricking frame at least one row of take-up means is provided which are equal among each another end each of which is provided with a brine supply line, to which take-up means tools can be fixed at choice which are different among each other and are formed by kinds of pickling needles provided with brine channels, each tool having a connection head which can be tightly connected to the take-up means, which connection head fits for all tools into the take up means, the connection heads being provided with connection channels for the brine supply to each pickling needle, which channels can be connected to the brine supply line.

Such tool holders in modern pickling machines have the advantage that the pickling operation can be adapted to different kinds of meat and different sizes of the meat pieces. Some kinds of meat need a comparatively great amount of pickling brine so that strong pickling needles are used having a comparatively wide inner brine channel. Other kinds of meat, however, require a more tender pickling operation so that thinner needles are used which serve for the injection of less amounts of brine per time unit. At choice-connection by screwing of the connection heads of the several kinds of needles enables one to change from one kind of needles to another kind of needles and therefor from one kind of pickling operation to another kind of pickling operation, always with the same machine. Therefore, the machine can be used with only less alterations for a broad field of application. These installations are on the market.

It is also known to screw a plurality of needles to a common cross piece of a pickling machine, which cross piece serves for supplying the brine (FR-A No. 1,395,301).

On the other hand, machines are known in which knives are fixed to a frame member which is moved up and down, which knives stab into the meat. With such knives the meat can be tenderized by making cuts, what, for example, is desired for such kinds of meat which later on shall be used as steak meat, why such machines sometimes are also called "steakers". It is also know (FR-A-No. 1 2,032,012) to fixly provide needles and knives on a common carrier member which can be actuated by hand or automatically. Finally it is know within a hand-actuated apparatus (U.S. Pat. No. 3,581,651), to provide a plurality of knives on a screw cap which is screwed onto the end of a container for a treatment liquid which flows out through openings of the bottom of the screw cap.

SUMMARY OF THE INVENTION

The invention has at an object to still increase the said versatility of a pickling machine and to make the pickling machine with less effort also applicable to such kinds of meat for which—if desired in addition to a pickling operation—a tenderizing operation is required. With this, the alterations necessary therefor shell be practicable in an easy manner, quickly and reliably with less effort in operation. The invention solves this task by providing further connection heads for at choice-fixing to these take-up means, which connection heads carry on their bottom knives and/or combinations of needles and/or combinations of knives and needles, each connecting head being adapted to be plugged to the take-up means and having openings for the passage f brine only for the needles carried by this connection head, however is tight with respect to the brine supply line for the knives, a pull-of safety measure for the connecting head being provided, for example a serration plate engaging the connecting head from below and being provided with slots into which the needles or knives, respectively, enter. In this manner a pickling machine can be changed by few manipulations to a machine with which also or only a tenderizing of the meat should be done. Therefore, with on single machine following operations are possible: pickling alone, tenderizing or steaking, respectively, alone, pickling combined with tenderizing (steaking). Each one of these three kinds of operation can be done in a different manner, because the kind and the number of pickling needles can be changed as well as the kind and number of knives. Thus, for example, it is possible to connect several tools, for example two or four pickling needles or knives, respectively on a common connecting head through which the pickling liquid is fed to the channels of the needles, however not to the knives. A change-over between the single kinds of operation can be done without any problem, inasmuch plugging of the single tools to the take-up means can be done more quickly and more reliably than by means of a screw connection because within the latter always there is the danger that by careless handling the screw thread member are not correctly connected to each other so that the screw threads are damaged and therefore the tool is defectively connected to the take-up means, besides of the danger that the incorrectly mounted screw thread connection becomes upright for the brine. In contradiction thereto, within the inventive subject an undesired escape of brine is reliably prevented by the connecting heads being tight for the knives. The pull-off safety measure prevents that the connection head is pulled-off the take-up means by the pressure of the supplied brine or by the resistance exerted by the meat when the tools (needles or knives, respectively) having entered the meat pulled out. A serration plate forming the pull-off safety means may be slidably guided in a guide of the pricking frame or may be connected thereto swivellably.

According to a further embodiment of the invention each connecting head has a body member which can be plugged in the take-up means, which body member is connected to a sleeve forming the bottom, preferably by screw threads, all body members preferably being formed equal to each other. This two-piece construction of the connecting head on the one hand facilitates its manufacture, on the other hand thereby an easy cleaning of the brine channels provided within the connecting head becomes possible, the screwed connection of the two body member pieces facilitating disassembling of the body member. Body members being equal to each other enable one to interchange the several elements. A particular favourable construction is achieved within the invention if between the bottom of the sleeve and the body member there is a hollow space, when the sleeve is connected to the body member, into which hollow space the brine openings are connected. This hollow space, as it were, constitutes a distribution chamber for the brine supplied through the brine supply line, that enhances an uniform distribution of the brine over all needles provided. Preferably, within the scope of the invention, the connection head is inserted by means of a pint into a fitting bore of the take-up means, the pin being intersected by the brine channel and being symmetrically with respect to rotation, the bore forming an enlargement of the brine supply line. Such a plug pin is easy to mount and enables one to turn the tool around its longitudinal axis, what is of advantage with various respects: On the one hand it enables one to adjust the direction of the cuts of the knives as desired, on the one hand this possibility exists also for the direction with which the brine leaves the pickling needles. The combined arrangement of knives and pickling needles has already the advantage that the distribution of the brine in the meat is made more favourable by the cuts produced by the knives, however this holds as much as more brine is injected into the meat in direction towards these cuts. When using a slotted serration plate, the rotation-symmetric form of the pin has also the advantage that the corresponding tool can be so turned that its knives or needles, respectively, can enter the slots of the serration plate without any problem.

The invention further refers to a tool combination for use in a tool holder of the described kind. The inventive combination consist in that at least one needle and at least one knife are connected to a common connecting head. As already mentioned, thereby a combined pickling and tenderizing operation is possible. Providing the needle and the knife on a common connection head shows the advantage that these tools are disposed. very close to each other so that the pickling liquid injected by the needle can reach the cuts into the meat to be treated formed by the knives, and this at a time at which these cuts are just formed so taht the cut cannot close again. Thereby the pickling liquid can better reach the meat portions neighbouring the region in which the needle sticks in, particularly if according to a further embodiment of the invention a plurality of knives are connected to the connection head around a central needle, preferably spaced in equal distances from each other. Thereby the pickling liquid supplied by the needle is distributed in all directions so that local excesses or defects of pickling are better avoided as this was possible until now. The best results are obtained within the scope of the invention, if the knives are disposed radially with respect to the central needle, because the radially disposed cuts made by the knives enhance the stream of the brine radially outward from the point at which the needle sticks in.

Another inventive tool combination for use in a tool holder of the described kind consists in that at least two knives are fixed to a common connection head. Thereby an intensive treatment of the meat in the sense of a tenderizing or steakening operation is obtained, by different directions of the knife planes different fibre directions in the meat being reliably covered so that the desired effect is independent from the direction of the fibres in the respective piece of meat or from the manner in which this piece of meat is positioned on the support of the machine, respectively.

BRIEF DESCRIPTION OF THE DRAWINGS

In the drawings the subject matter of the invention is schematically shown by way of examples.

FIG. 3 shows in side view a combination tool connected to a take-up means.
FIG. 4 shows a detail of FIG. 3 in an enlarged scale and in section and;
FIG. 5 is a section along the line V—V of FIG. 4.

DETAILED DESCRIPTION OF THE PREFERRED EMBODIMENT

Figure 7:
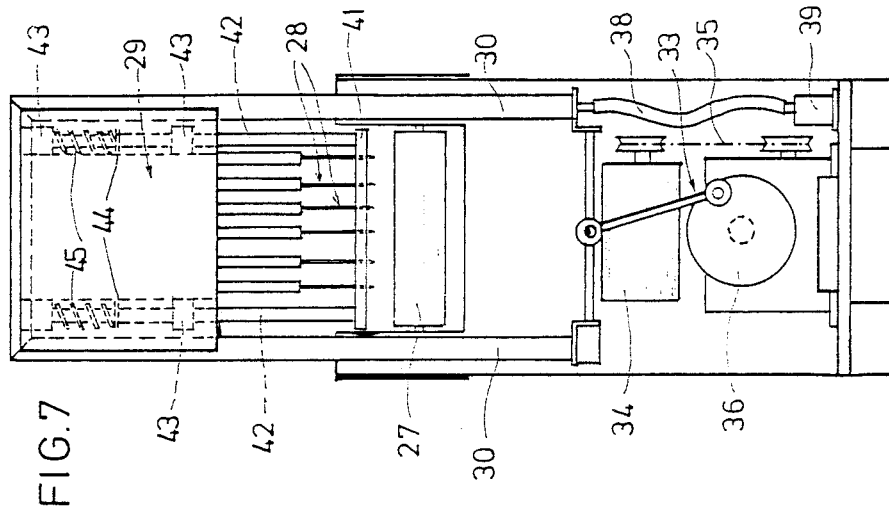
FIG. 6 shows how such tools are disposed on a pickling machine and
FIG. 7 is a section along the line VII—VII of FIG. 6.
Figure 6:
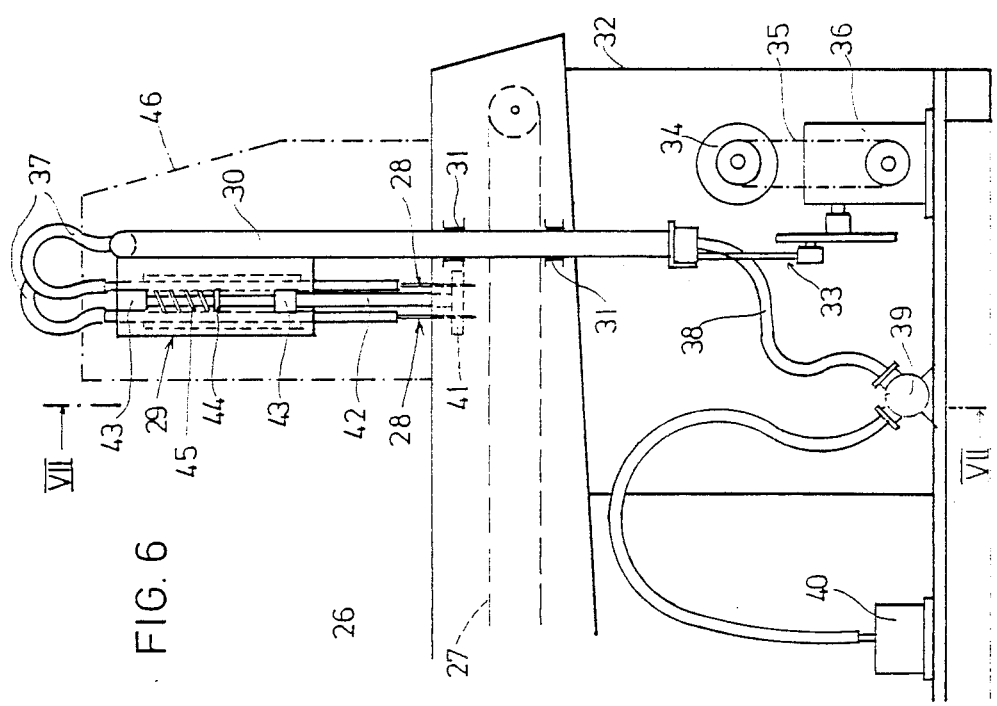

On a pickling machine 26 (FIGS. 6,7) the material to be pickled (particularly meat) is supplied on a support surface 27 formed as a conveyor band to the tools 28, for example to injection needles for brine to be injected. The tools 28 are held in a needle box 29 which is disposed shiftably towards the support surface 27. The needle box 29 is fixed to a pricking frame 30 formed by tubes, which frame is shiftably beared in slide bearings 31 of the machine frame 32 for up and down movement. The pricking frame 30 is driven to this motion by a motor 34 via a belt 35, a gearing 36 and a crankshaft 33. For supplying brine to the injection needles, the injection needles are connected by hoses 37 to the tubes of the prickling frame 30 which below is connected to a hose 38 supplied with brine from a pump 39. The pump sucks the brine from a brine source 40 via a hose.

In order to avoid that the tools 28 are damaged when impinging on a bone in the meat, the tools are resiliently beared in the needle box 29 against the action of spring (not shown). The tools may also be mounted for swivelling motion in the needle box.

Further, a stripper 41 is provided which is suspended on two rods 42 longitudinally guided in slide bearing 43 fixed to the needle box. Each rod 42 carries a ring 44 adjustable fixed to the rod, which ring forms the one abutment of a spring 45, the other end of which is abutted against the upper slide bearings 43. During the downward motion of the needle box 29 the stripper 41 is taken along as long as it engages the material to be treated, whereupon the needle box together with the tools is further lowered, whereas the stripper remains in its position. The springs 45 are compressed thereby. When the needle box 29 is lifted again, the springs 45 are relieved and the stripper 41 is lifted off the meat as soon as he lower slide bearing 43 engages the ring 44. This relative movement of the stripper 41 with respect to the needle box 29 may be used in a manner known per se for controlling the stream of brine to the injection needles, so that brine only then escapes from the injection needles if these needles have penetrated the meat.

Suitably the conveyor bank forming the support surface 27 moves stepwisely so that the material to be pickled can be treated in stationary condition. For this purpose take-up means 1 (FIGS. 3,4) are provided for taking up the tools 28 (needles and/or knives) working on the meat, which take-up means are disposed in row transversely to the direction of the movement of the meat, each of the take-up means being provided with a central brine supply line 2 for the supply of pickling liquid, which line enlarges towards the lower end of the take-up means 1 in a bore 3 which is pin 4 of a connection head 5 can be plugged in with a snugly fit, which in is shaped symmetrically with respect to rotation. The pin 4 has on its circumference a plurality of annular grooves 6 for seating O-rings 7 serving for tightening the pickling liquid and is formed in one single piece on its lower end with a body member 8 of the connection piece 5. The body member 8 carries screws threads 9 on its outer periphery, to which screw thread inner screw threads 10 of a sleeve 11 are screwed, which sleeve is closed on its lower end by a bottom 12 to which at least one of the tools 28 is fixed, thus at least one needle 13 and/or at least one knife 14. In the shown examplative embodiment (FIG. 3, 4, 5) the sleeve 11 carriers below a central needle 13, four knives being disposed around this needle in equal distances from each other and symmetrically with respect to the longitudinal axis of the take-up means 1.

To the brine supply line 2 of the take-up means 1 a connection channel 15 in the pin 4 and in the body member 8 is connected which supplies the brine to the bottom surface 16 of the body member 8, which surface is spaced apart from the top surface 17 of the shell 11 when same is fully screwed on, so that between these two surface 16,17 a hollow space 18 is formed. This hollow space 18 is tightened to the outside by an annular sealing 19 inserted between a flange of the body member 8 and the upper edge of the shell 11. The needle 13 is formed by a tube and intersects the bottom 12 so that the brine channel 20 of the needle is connected to the hollow space 18. For this purpose, the bottom 12 of the shell 11 (FIG. 4) has an opening 25 for each needle 13, into which opening the needle 13 can be inserted. For the knives 14 or for their fixing pints on the bottom 12, this bottom, however, is tight so that no brine can escape unintentionally. From the brine channel 20 of the needle 13 the brine which is supplied through the brine supply line 2 under pressure, flows out through one or more openings 21 (FIGS. 3) in the region of the tip of the needle 13.

In order to avoid that the connection head 15 is pulled off the take-up means 1 by the brine pressure in the hollow space 18, a serration plate 22 may be provided which may be slidably guided in a guide means 23 (FIG. 3) of the needle box in horizontal direction. This serration plate 22 is provided with slots 24 extending in direction of the shifting movement, into which slots the tools (needles 13 or knives 14, respectively) enter in the serration position of the serration plate 22 (FIG. 5). In the serration position the serration plate 22 can be secured by fixing means (not shown), for example by a resilient protrusion entering into a notch, in order to avoid an unintentional loosening.

Figure 1:
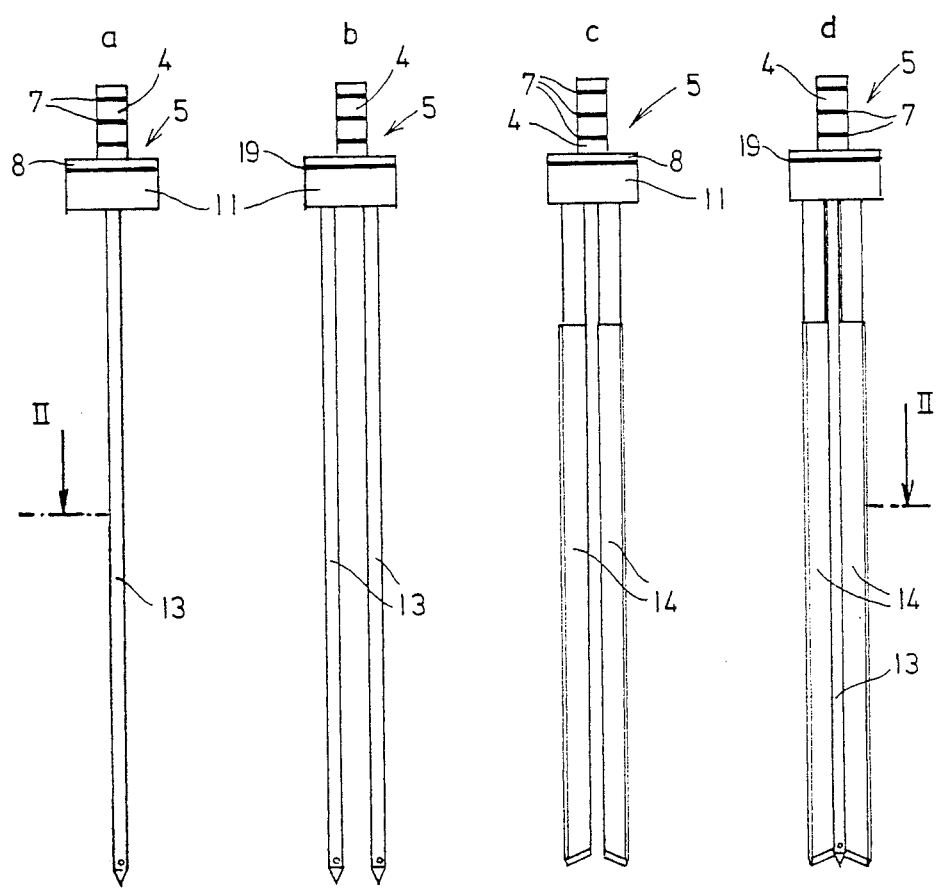
FIGS. 1 shows four different tools in side view.
Figure 2:
FIG. 2 is as section along the line II—II of FIG. 1.

After having shifted back the serration plate 22, the connection head 5 together with the tools carried by it can be easily separated from the take-up means 1. This plug-in-connection enables it to change the tools carried by the respective connection head 5 against other tools without any problem. These other tools are tool combinations, respectively, are fixed to connection heads 5 (FIG. 1) of equal kind of equal size, which fit into the take-up means 1. In FIG. 1 by a,b,c,d, four examples are shown, from which the example d shows a tool combination built up as a multiple tool, which tool combination corresponds so that according to FIG. 3 to 5, thus having a central needle 13 or four knives 14 disposed in a circle around the needle. This tool combination, therefor, constitutes a multiple knife with needle.

Within the tool combination c (FOG. 1) four knives 14 are disposed in the same manner as with the combination d, however there is no central needle.

Within the tool combination b four needles 13 equal to each other are disposed in a square. This tool combination, therefore, forms a multiple needle.

Within the variant a only one single needle 13 is fixed to the connection head 5, which needle, however may be thicker and may be provided with a brine channel 20 having a greater diameter than within the needle 13 of the variant b.

Within the variants c and d the knives 14 the cross section planes of the knives 14 are disposed radially with respect to the center or to the axis of the needle 13, respectively. This favourizes the distribution of the pickling brine quantity injected by the needle in the meat.

The tool combinations shown in FIG. 1 may also comprise needles of different thickness.

Instead of a shiftable serration plate 22 also a pivotably beared serration plate can be used, which for example can be held on the needle box 29 pivotably around a horizontal axis or may also be swivellable around a vertical axis.

The needle box and the tools may be covered by a housing 46 (FIG. 6) shown with dash and dot lines.

I claim:

1. Tool holder for a pickling machine comprising a pricking frame having at least one row of take-up means is provided equal to each other and each including a brine supply line;
   take-up means tools selectively affixed to said brine supply line at a chosen position, said take-up means tools being different from each other and including pickling needles having brine channels formed therein, each tool having a connection head tightly connected to said take-up means;
   each said connection head fitting into said take-up means, and including a connection channel for the brine supply to each pickling needle, said connection channels being connected to said brine supply line;
   said connection heads being disposed at said chosen position, said connection heads including a bottom and combinations of one or more knives and, needles disposed on said bottoms;
   each connecting head having means for plugging to said take-up means and openings for the stream of the brine only for the needles carried by the connection head, said take-up means being closed with respect to the brine supply line for the knives; and
   a pull-off safety measure for the connection head, engaging the connection head from below and having slots entered by the needles or knives, respectively.

2. Tool holder according to claim 1 wherein said means for plugging comprises a body member, and a sleeve for connection to said bottom.

3. Tool holder according to claim 1, a hollow space formed between the connection of said sleeve and said body member, said openings being connected to said hollow space.

4. Tool holder according to claim 1, wherein said take-up means includes a fitting bore, a pin for inserting said connection head into said fitting bore, the pin being intersected by the brine channel and being symmetrical with respect to rotation, the bore forming an enlargement of the brine supply line.

5. Tool combination for use in a tool holder according to claim 1, wherein at least one needle and at least one knife are connected to a common connection head.

6. Tool combination according to claim 5, wherein a plurality of knives are connected to the connection head around a central needle.

7. Tool combination according to claim 6, wherein planes of the knives are disposed radially with respect to the central needle.

8. Tool combination for use in a tool holder according to claim 1, where at least two knives are connected to a common connection head.

9. Tool holder according to claim 1 wherein said pull-off safety measure comprises a locking plate.

10. Tool holder according to claim 2 wherein said bottom is connected to said sleeve by a screw connection.

11. Tool holder according to claim 2 wherein said body members are formed equal to each other.

12. Tool combination according to claim 6 wherein said plurality of knives are spaced around said central needle at equal distances from each other.

* * * * *